Jan. 5, 1965   G. C. ANDERSON   3,164,769
FREQUENCY REGULATOR
Filed Oct. 17, 1960   4 Sheets-Sheet 1
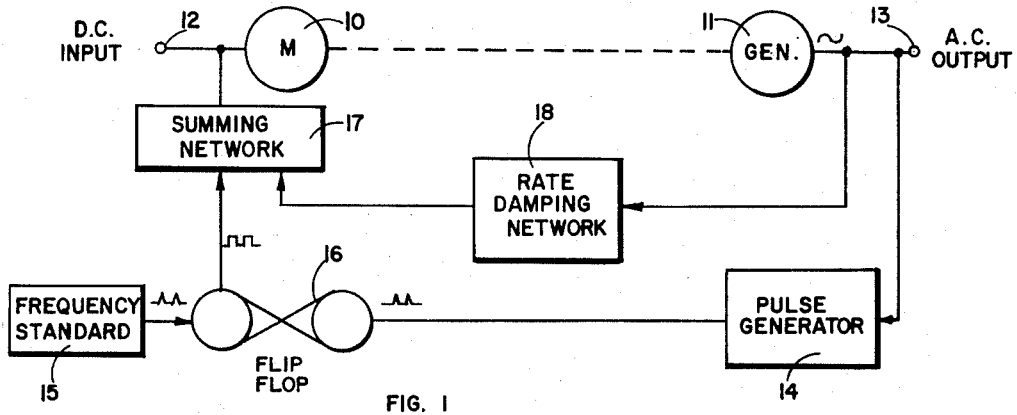
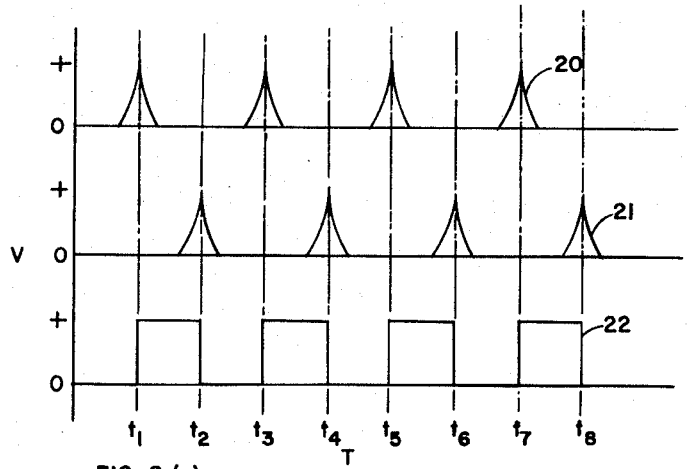
FIG. 2 (a)
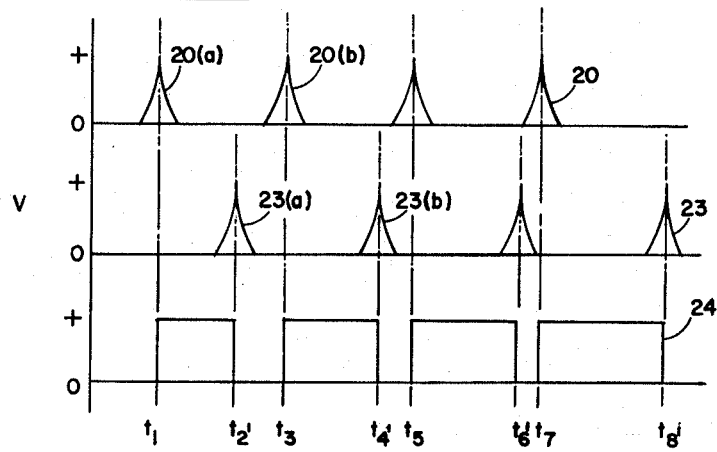
FIG. 2 (b)
INVENTOR.
GEORGE C. ANDERSON
BY
AGENT

*INVENTOR.*
GEORGE C. ANDERSON
BY John A Duffy
AGENT

Jan. 5, 1965  G. C. ANDERSON  3,164,769
FREQUENCY REGULATOR
Filed Oct. 17, 1960  4 Sheets-Sheet 3

INVENTOR.
GEORGE C. ANDERSON
BY
John A. Duffy
AGENT

INVENTOR.
GEORGE C. ANDERSON
BY
AGENT

United States Patent Office 3,164,769
Patented Jan. 5, 1965

3,164,769
FREQUENCY REGULATOR
George C. Anderson, Whittier, Calif., assignor to
North American Aviation, Inc.
Filed Oct. 17, 1960, Ser. No. 62,907
3 Claims. (Cl. 322—32)

This invention relates to alternating-current power supplies and more particularly to the frequency regulation of power supplies.

The precise accuracy demanded in many of today's missile electronic systems, requires an alternating-current source of precision frequency. A source of precise supply frequency insures an accurate output and a minimum speed error in alternating-current devices such as gyro and timing motors utilized in inertial navigation systems.

The frequency regulator of an alternating-current generating system may include a closed loop servo control system between the output of an alternator and the input of a device for driving the alternator. Precision frequency control is difficult in such systems because such factors as changes in temperature, load, power factor, and electronic component characteristics combine to produce a substantial frequency drift. This frequency drift or error, accumulates over a period of time producing a substantial error incompatible with accuracy requirements.

Frequency regulating devices of the prior art have been unable to prevent the accumulation of errors due to frequency drift. Control circuits have been complicated, requiring numerous electronic components of limited reliability and inefficient operation. Additionally, the speed of response of prior art systems has been slow due to complicated control circuits. Accordingly, it is an object of this invention to provide an improved frequency regulator.

The device of this invention contemplates as a material feature thereof, a frequency control system for alternating-current generating devices in which the steady state error is zero. A precision frequency standard is compared to the frequency of the alternating-current generator in a manner to provide an integrated error signal indicative of the phase deviation of the generator from the precision standard. This integrated error signal operates to control the speed of the alternating-current generating means to maintain the frequency slaved to the frequency of the standard. A simple and accurate transistorized switching circuit is provided to integrate the phase deviation of the generating means from the standard.

It is a further object of this invention to provide a frequency regulator having a zero steady state error.

It is another object of this invention to provide a transistorized frequency regulator system for an alternating-current generating device.

It is still another object of this invention to provide an integrated error control signal for regulating the speed of an alternator.

Other objects of invention will become apparent from the following description read in conjunction with the accompanying drawings in which:

FIG. 1 is a block diagram illustrating the principal features of the frequency regulator of this invention;

FIGS. 2a and 2b are waveform analysis of the input and output waveforms of the integrating flip flop of FIG. 1;

Figure 3:
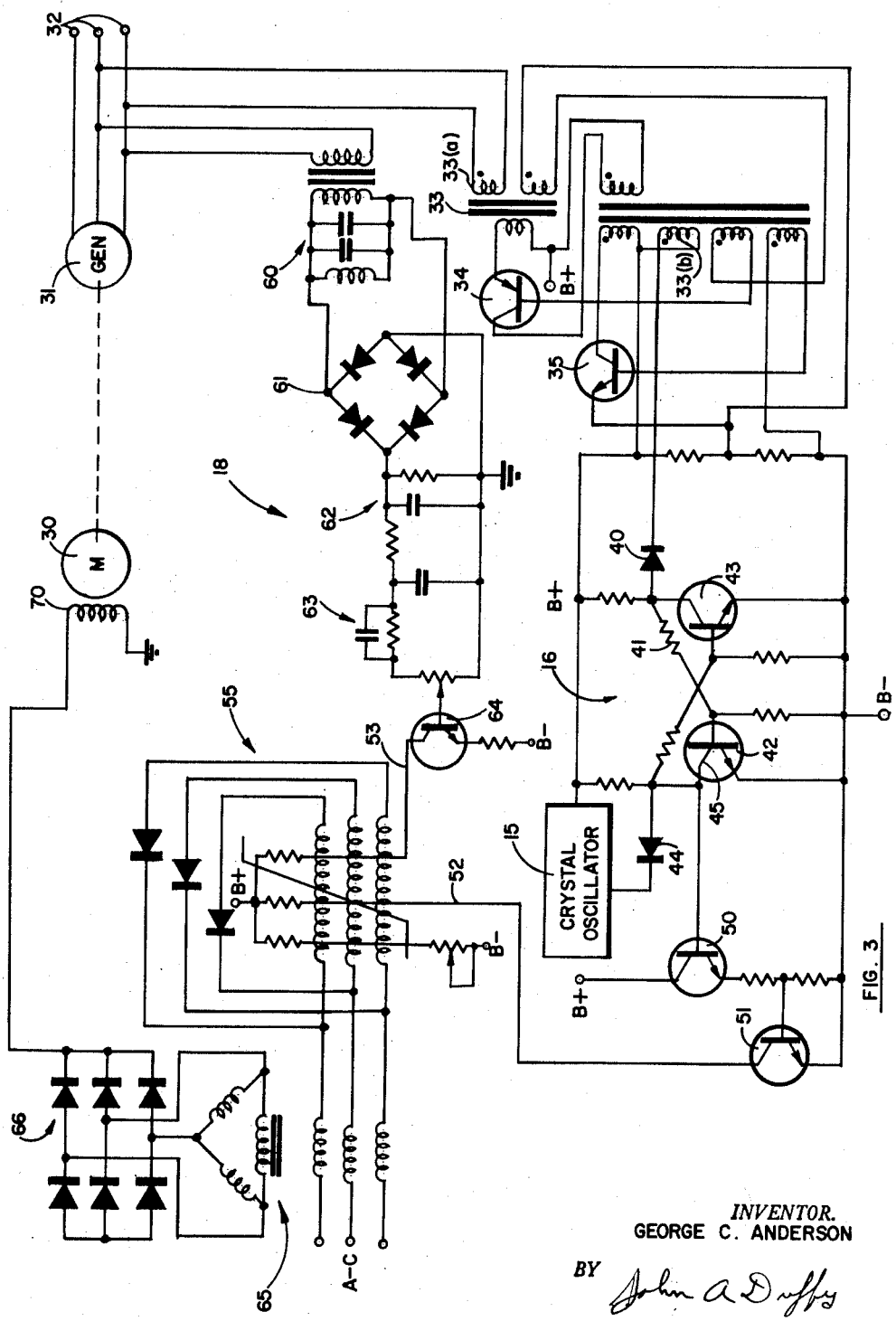
FIG. 3 is a schemtic diagram of one aspect of the invention as applied to the frequency regulator of a motor generator device.

Referring now to the block diagram of FIG. 1, there is shown an inverter comprising a conventional D.-C. motor 10 mechanically connected to drive an alternating-current generator 11. An input terminal 12 is responsive to a source of direct current to provide energy for the motor 10 and an output terminal 13 provides the alternating-current output from the generator 11. Frequency regulation of the generator 11 is provided by a closed loop servo regulating system including a pulse generator 14 responsive to the output of the generator 11 to produce pulse signals corresponding to frequency. A frequency standard 15 generates pulse signals indicative of a prededetrmined standard precision frequency. The outputs of the pulse generator 14 and the frequency standard 15 are connected to switch a flip flop 16. The pulse generator 14 causes the flip flop 16 to switch to the first state and frequency standard 15 switches the flip flop 16 to the second state. The output of the flip flop 16 at one of its states is indicative of the deviation of frequency of the generator 11 from the frequency of the standard 15. The deviation or error output signal from the flip flop 16 is combined in a summing network 17 with a damping signal provided by a rate damping network 18 to provide a control signal to the input of the motor 10 which regulates the speed of the inverter to cause the frequency generated by the generator 11 to conform to the frequency of the standard 15.

The steady state frequency error signal generated by the servo control system of FIG. 1 is equal to zero because of the fact that the output of the flip flop 16 is a signal indicative of the integral of the deviation in phase between the output of the pulse generator 14 and the standard 15. In other words, the phase difference between the output of the generator 11 and the standard 15 is indicative of the error of the output of generator 11 and this error is integrated by the flip flop 16 to provide a control signal in the servo loop to correct the error. The zero steady state error or final error signal is produced by integrating the error signal. In closed loop servo systems of the device, a zero steady state error system is produced for a control quantity (for example, frequency) upon a single integration of the error signal produced at the output of the flip flop 16. Thus, the single integration system illustrated in FIG. 1 provides a steady state error signal of zero which insures that over a period of time the final error of generator 11 as compared to the standard 15 will be zero. Effectively, then the frequency of the generator 11 is slaved to the frequency of the standard 15. Such accuracy was unobtainable in prior art systems which provided no integration of the control quantity.

A ready understanding of the integrating features of the flip flop 16 of FIG. 1 may best be understood by an analysis of the waveforms at the input and output of the flip flop 16, as illustrated in FIG. 2. FIG. 2a illustrates the input and output waveforms occurring when the frequency of the generator 11 is exactly equal to that of the standard 15. In FIG. 2a, the waveform 20 is indicative of the signals generated by the standard 15. For effective operation purposes, only the positive half cycles of operation are utilized. The waveform 21, indicative of the output of the pulse generator 14, is produced by standard biasing methods so as to be effectively 180° out of phase with the waveform 20 when the alternating-current signal from generator 11 from which it is derived is exactly in phase with the signal from the standard 15. The waveform 22 is generated at one of the output states of the flip flop 16, and represents the integrated error signal since the waveform 20 commences the flip flop output and the waveform 21 terminates it.

Turning now to an initial operating time $t_1$ in FIG. 2a, it is seen that a positive pulse is being generated by the standard 15. The flip flop 16 (FIG. 1) is switched from the first state to the second by this pulse, producing a change in potential at its output from zero to positive, as shown by the waveform 22. At the time $t_2$, a pulse from the generator 14, shown as the waveform 21, causes the flip flop 16 to switch to the second state illustrated by the change in potential from plus to zero of the waveform 22. Similarly, at the times $t_3$, $t_5$, and $t_7$ a pulse from the standard 15 switches the flip flop 16 from the first state to the second and at the times $t_4$, $t_6$, and $t_8$ a pulse from the generator 14 switches the flip flop 16 from the second state to the first. Thus, the waveform 22 is a rectangular error signal which is utilized in the summing network 17 of FIG. 1 to provide the control for the motor 10.

Bias constants are utilized in the summing network 17 of FIG. 1 to exactly compensate for the average rectangular error signal produced by the waveform 22 so that the control signal from the network 17 does not change the speed of the motor 10 when an error signal such as the symmetrical waveform 22 is produced. This is indicative of the fact that the pulse of the waveform 21 is exactly 180° out of phase from the pulse of waveform 20 to produce a waveform 22 which is symmetrical and that the frequency of the generator 11 is therefore equal to the frequency of the standard 15 and the phase difference between the standard 15 and the generator 11 is zero.

Turning now to FIG. 2b, wherein the waveform 20 is indicative of the output of standard 15, there is shown a waveform 23 which is indicative of the output of the generator 14 when the phase difference between the generator 11 and the standard 15 has increased. The rectangular error signal produced at the output of the flip flop 16 is illustrated by the waveform 24. At the time $t_1$ the pulse $20(a)$ switches the flip flop 16 to the first state causing the waveform 24 to rise from zero to a plus voltage. At the time $t_2'$ the pulse $23(a)$ switches the flip flop to the second state causing the waveform 24 to go from positive to zero. Since the phase of the generator 11 has shifted relative to the phase of the standard 15, the pulse $23(a)$ lags the pulse $20(a)$ by more than the predetermined 180°, thereby increasing the width of the waveform 24 between the times $t_1$ and $t_2'$, from the average width between the times $t_1$ and $t_2$ shown in the waveform 22 of FIG. 2a.

Therefore, since the area under the waveform between the times $t_1$ and $t_2'$ is greater than the area in the waveform 22 between the times $t_1$ and $t_2$, an increase in output current from the flip flop 16 is provided which in turn adds control current to the summing network 17 and the motor 10 of FIG. 1 to increase the speed of the motor 10. At the time $t_3$ the pulse $20(b)$ from the frequency standard again causes the flip flop to switch to the second state. At the time $t_4'$ the pulse $23(b)$ from the generator 14 causes the flip flop 16 to switch to the first state. Because of the fact that the signal from the generator 11 is out of phase from the signal of the standard 15 by more than 180°, the time that the waveform 24 is at a positive potential increases progressively with the area under the curve between the times $t_1$ and $t_2'$ increasing progressively between the times $t_3$ and $t_4'$, $t_5$ and $t_6'$, and $t_7$ and $t_8'$. During the times $t_2'$, $t_4'$, $t_6'$, and $t_8'$, when a signal from the pulse generator 14 is switching the flip flop, the time lag is increasing progressively due to the accumulating phase difference between the output of generator 14 and the standard 15. This then provides the integrating action in which the deviation in frequency of the output of generator 11 from the standard 15 is integrated by the action of the flip flop 16. The waveform 24 progressively increases in area until the frequency of the generator 11 is returned to the predetermined frequency of the standard 15 by the control signal from the closed loop servo regulating system of FIG. 1. In this manner, changes in frequency at the output of generator 11 cause almost instantaneous frequency changes at the input of the inverter of FIG. 1 to correct the error. Further, as stated before, due to the integrating action of the flip flop 16, a steady state or final error signal equal to zero is derived.

Referring now to FIG. 3, there is shown a schematic diagram of one aspect of the invention as applied to the frequency regulation of a motor generator set. In FIG. 3, a D.-C. motor 30 drives an A.-C. generator 31 which produces a three-phase output at the terminals 32. A single phase of the generator 31 output is connected to the input of a frequency division circuit, including a transformer 33 having a primary winding $33(a)$ connected to receive a single phase output from the generator 31. The transformer 33 is connected in circuit with transistors 34 and 35 to provide a submultiple of the frequency of the generator 31 and to provide at the output winding $33(b)$ a phase shifted pulse signal which may be, for example, 180° relative to the standard 15, indicative of a submultiple of the frequency of generator 31. The frequency division, phase shifting and pulse shaping functions of the transformer 33 and the transistors 34 and 35 may comprise the pulse generator 14 of FIG. 1. The output of the winding $33(b)$ is fed through a diode 40 and a resistor 41 to the base of a transistor 42 which is coupled with a transistor 43 to form a standard Eccles-Jordan bistable multivibrator, also known as a flip flop. The frequency standard 15, which may be a precision crystal oscillator, is coupled through a diode 44 to the base of a transistor 43. Thus, the output signal from the winding $33(b)$ causes the flip flop 16 to switch states with transistor 42 conducting and presenting a zero output at its collector and the transistor 43 non-conducting indicative of the flip flop 16 being in a first state. An output signal from the standard 15 causes the transistor 43 to conduct and the transistor 42 to cut off with positive output signals appearing at the collector 45 indicative of the state of the flip flop 16. The collector 45 is connected to the base of a transistor 50 which amplies the output signal with a transistor 51 acting as a power amplifier to further amplify the signal and present it to a control winding 52 of a magnetic amplifier summing network 55.

The output signal of the generator 31 is also sensed by a rate damping network including a resonant circuit 60 tuned to the output frequency of the generator and responsive to the output of the generator 31 to provide a rate damping signal through a demodulator 61, a filter 62, and a lead network 63 to the transistor 64 which amplifies the rate damping signal and presents a control signal to the control winding 53. The magnetic amplifier 55 sums the signals presented at the control windings 52 and 53 and presents the summed output through a transformer 65 and a rectifier 66 to a shunt winding 70 of the motor 30.

In operation of the circuit in FIG. 3, a deviation in frequency of the output of generator 31 from the standard established by oscillator 15 is integrated by the flip flop 16 and amplified by the magnetic amplifier 55 along with the rate damping signal from the network 18 to provide a direct-current control current signal to the shunt winding 70 to control motor 30. The control signal is the integral of the error between the generator phase and the phase of the standard frequency to provide precision frequency control. The phase difference between the output of the standard 15 and the output of the generator 14 is preferably 180° to provide the maximum control for both increases and decreases in frequency of the generator 31. It is to be realized that depending upon the characteristics of the servo loop system, other initial phase angles may be utilized.

Figure 4:
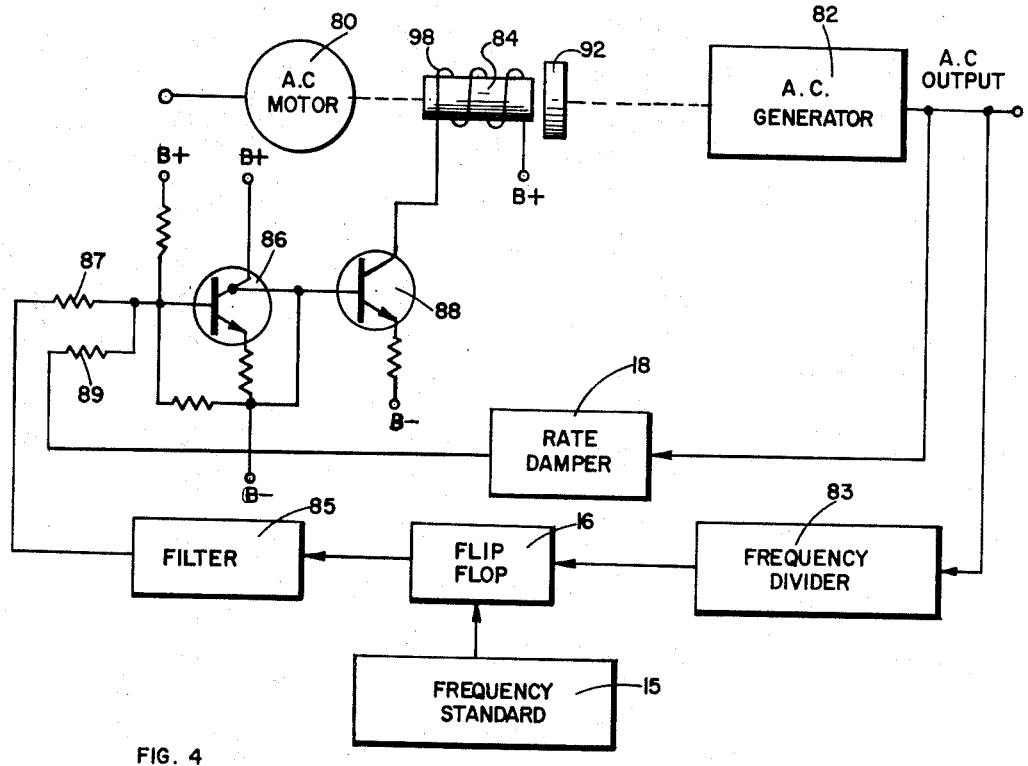
FIG. 4 is a schematic diagram, partly in block, of another aspect of invention illustrating the frequency regulation of an alternating-current motor-generator system.

Referring now to FIG. 4, there is shown an aspect of the invention wherein frequency regulation is provided for an alternating-current generating system having an alternating-current motor 80 of 60 cycles, for example, connected through a magnetic clutch 81 to drive an alternating-current generator 82 of 400 cycles, for example. The clutch 81 may comprise an eddy current clutch having magnetically co-operating plates 84 and 92 and a control winding 98. A closed loop frequency regulating system is provided according to the invention with a frequency divider 83 providing submultiple frequency pulses to one input of the flip flop 16 and a frequency standard 15 providing a submultiple frequency standard to the other input of the flip flop 16. The output of the flip flop 16 which is an integrated error signal is then coupled through a filter 85 to a transistor summing circuit including a transistor 86 with its base receiving the output signal from the filter 85 through the summing resistor 87. A rate damper 18 presents the rate damping signal through a summing resistor 89 to the base of the transistor 86. The output of the transistor 86 is coupled through a transistor power amplifier 88 to present a direct-current control signal to the control winding 98 of the clutch 81. The eddy current clutch 81 operates in a well-known manner to control the speed of the shaft of the generator 82 in accordance with the control signal provided by the amplifier 88. In this manner, an effective zero steady state error signal is provided.

Figure 5:
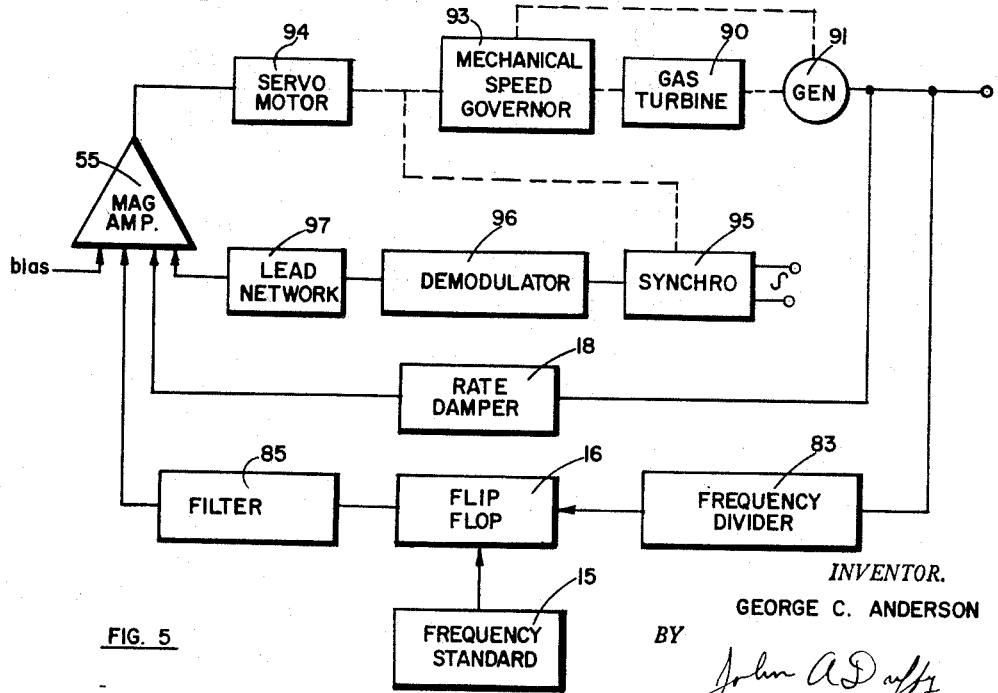
FIG. 5 is a block diagram illustrating a further aspect of the invention in which the frequency of a turbine generator system is regulated.

Turning now to FIG. 5, there is shown a further aspect of the invention wherein frequency regulation is provided for an alternating-current generating system wherein a gas operated high-speed turbine 90 drives a three-phase alternating-current generator 91. The output of the generator 91 is fed through the frequency control network comprising the frequency divider 83, the frequency standard 15, and the flip flop 16 to provide an integrated error signal to a winding of the magnetic amplifier summing circuit 55. Rate control is provided by the rate damping network 18. The speed and thereby frequency of the system is basically controlled by a mechanical speed governor 93 which controls the rate of flow gas to the chamber of the turbine 90. The speed governor 93 may comprise a common spring fly weight governor supplied as a part of the turbine generator set which is adapted to receive a shaft signal from the generator 91 to control the flow of gas to the turbine 90. The servo motor 94 is driven from the output of the magnetic amplifier 55 and provides an integrated error signal to the shaft of the governor 93. Additionally, a position servo loop is added including a mechanical output from the governor 93 to a synchro 95 which is utilized through a demodulator 96 and a rate network 97 to provide current to a control winding of the magnetic amplifier 55.

Figure 6:
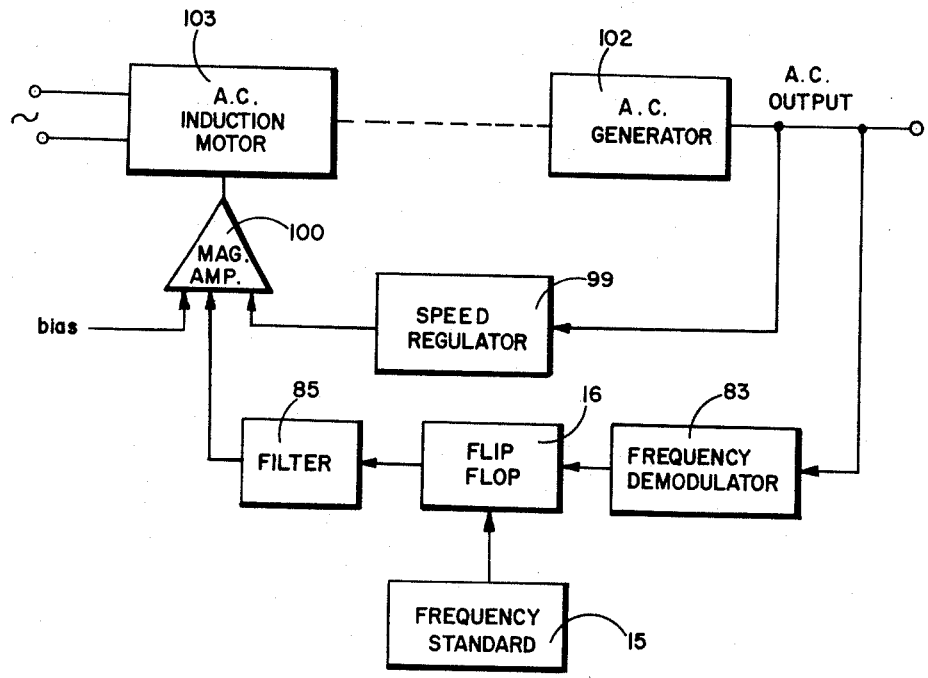
FIG. 6 is a block diagram illustrating another aspect of the invention applying the frequency regulating device of the invention to a system already having speed regulation.

Referring now to FIG. 6, there is shown an aspect of the invention in which the integrated error signal provided at the output of the flip flop 16 is utilized to provide precision regulation to a system already employing a speed regulator 99. The regulator 99, as used in the prior art, may comprise the rate damper 18 illustrated in FIG. 1, which includes a resonant circuit tuned to the output frequency of the generator 102 to provide a rate damping or regulating signal through a demodulator, a filter, and a lead network to the magnetic amplifier summing arrangement 100 which operates to control the speed of an A.C. induction motor 103. Motor 103 may preferably be of the high slip induction type whereby the speed of the motor may be controlled by varying the voltage to the windings thereof.

Controlling the speed of the generator 102 in FIG. 6 with only the regulator 99 provides a common rate controlled system which does not provide a zero steady state error signal. Therefore, the flip flop 16 and associated filter 85, frequency divider 83 and frequency standard 15 components are included to provide an additional control signal to the magnetic amplifier 100 as described previously to provide zero steady state error control.

The accuracy of the frequency regulation of the device of this invention in the several aspects described is determined entirely by the frequency standard. Since standards such as crystal oscillators have accuracies of 0.001 percent, it is readily seen that a high degree of frequency regulation may be obtained. Errors due to temperature changes, changes in load, and changes in electrical component characteristics are all canceled out by the integrating action of the closed loop servo regulating system which provides a zero steady state error. Additionally, in the embodiment utilizing transistor controls, a more reliable and versatile control system is provided. The frequency regulator system of this device may be utilized to regulate the frequency output of any alternating-current generating system.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A frequency control system for alternating current generating means comprising, frequency reference means for generating a predetermined precision frequency, phase shifting means connected to be responsive to the output of said A.-C. generating means for establishing an initial phase difference from said precision frequency, semiconductor means responsive to the output of said phase shifting means and said frequency reference means for integrating the phase difference of said A.-C. generating means from said frequency reference, and means responsive to said integrating means for controlling the speed of said generating means in accordance with the integrated deviation of the phase of said generating means from the phase of said reference.

2. The combination recited in claim 1 wherein is included a feedback circuit responsive to the frequency of said A.-C. generating means for generating a signal corresponding to the rate of said frequency, and means for combining said rate signal and the output of said integrating means.

3. In a frequency regulator circuit for controlling the speed of an inverter having a motive source and a generator driven by said motive source for producing alternating current comprising, a pulse generator responsively connected to the output of said generator for producing pulse signals indicative of the frequency of said generator, and including means for shifting the phase of the output of said generator a predetermined amount, frequency reference means for producing pulse signals indicative of a predetermined standard frequency, a transistorized flip flop having two states, said flip flop responsively connected to be alternately switched from one state to the other by the pulse signals indicative of said phase shifted generator frequency and the pulse signals indicative of said standard frequency, a rate damping network responsively connected to the output of said generator for producing a signal indicative of the rate of change of frequency of said generator, means for summing the outputs of said flip flop and said rate damping network to provide a speed control signal to said motive source.

References Cited in the file of this patent

UNITED STATES PATENTS

| | | |
|---|---|---|
| 2,798,997 | Curtis | July 9, 1957 |
| 2,995,690 | Lemon | Aug. 8, 1961 |
| 3,071,720 | Geissing | Jan. 1, 1963 |